(12) United States Patent
Tomasetta et al.

(10) Patent No.: US 11,104,468 B1
(45) Date of Patent: Aug. 31, 2021

(54) END EFFECTOR AND SYSTEM FOR LABEL APPLICATION

(71) Applicant: Amazon Technologies, Inc., Seattle, WA (US)

(72) Inventors: Stephanie Tomasetta, Seattle, WA (US); Scott Beute, Grand Rapids, MI (US); Bret Hoeksema, Grand Rapids, MI (US); Tolga Kol, Dudelange (LU); Stefano La Rovere, Bereldange (LU); Roland J. Menassa, Renton, WA (US); David Terhaar, Grand Rapids, MI (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 16/134,278

(22) Filed: Sep. 18, 2018

(51) Int. Cl.
| | |
|---|---|
| *B32B 41/00* | (2006.01) |
| *B65C 1/02* | (2006.01) |
| *B65C 9/40* | (2006.01) |
| *B65C 9/26* | (2006.01) |
| *B25J 11/00* | (2006.01) |

(52) U.S. Cl.
CPC .......... *B65C 1/021* (2013.01); *B25J 11/0075* (2013.01); *B65C 9/26* (2013.01); *B65C 9/40* (2013.01)

(58) Field of Classification Search
CPC ... B65C 1/021; B65C 9/26; B65C 9/40; B25J 11/0075

USPC .................... 156/60, 64, 350, 351, 378, 379
See application file for complete search history.

(56) References Cited

U.S. PATENT DOCUMENTS

| | | | |
|---|---|---|---|
| 2008/0131255 A1* | 6/2008 | Hessler ............... | B65G 1/1378 414/788.1 |
| 2015/0225104 A1* | 8/2015 | Reed ....................... | B65B 61/26 347/110 |
| 2018/0240065 A1* | 8/2018 | Hilsley ............. | G06Q 10/0832 |

* cited by examiner

*Primary Examiner* — Michael N Orlando
*Assistant Examiner* — Joshel Rivera
(74) *Attorney, Agent, or Firm* — Patterson + Sheridan, LLP

(57) ABSTRACT

A method of applying a label to a transport structure includes receiving the label from a label dispenser with an end effector, in which the label includes information related to a plurality of storage containers secured to the transport structure with a restraining member. The method further includes measuring a position of the end effector relative to an object, moving the end effector with the label to a target position based upon the measured position, and applying the label to the restraining member with the end effector. The method may further include moving the end effector away from the storage containers, and transporting the transport structure with the storage containers and the label based upon the information of the label.

20 Claims, 14 Drawing Sheets

END EFFECTOR AND SYSTEM FOR LABEL APPLICATION

BACKGROUND

The present disclosure relates to applying a label to a restraining member, and more specifically, to an end effector or system used to grasp and apply a label to the restraining member that secures storage containers to a transport structure.

In warehouse operations and other industrial or commercial applications, labels having various types of information are printed and applied to a variety of objects. For example, in the shipping industry, a shipping label with an address is printed and applied to a package for directing the shipment the package. In a warehouse setting, multiple storage containers may be secured to a transport structure to facilitate shipping the containers between various warehouses or destinations. The storage containers may individually have labels, such as to describe the contents within each of the containers. However, with the increased use of automation, the application of labels may be optimized to reduce the reliance on human intervention and decrease the likelihood of improper label application.

BRIEF DESCRIPTION OF DRAWINGS

Various embodiments in accordance with the present disclosure will be described with reference to the drawings, where like designations denote like elements.

DETAILED DESCRIPTION

Figure 1A:
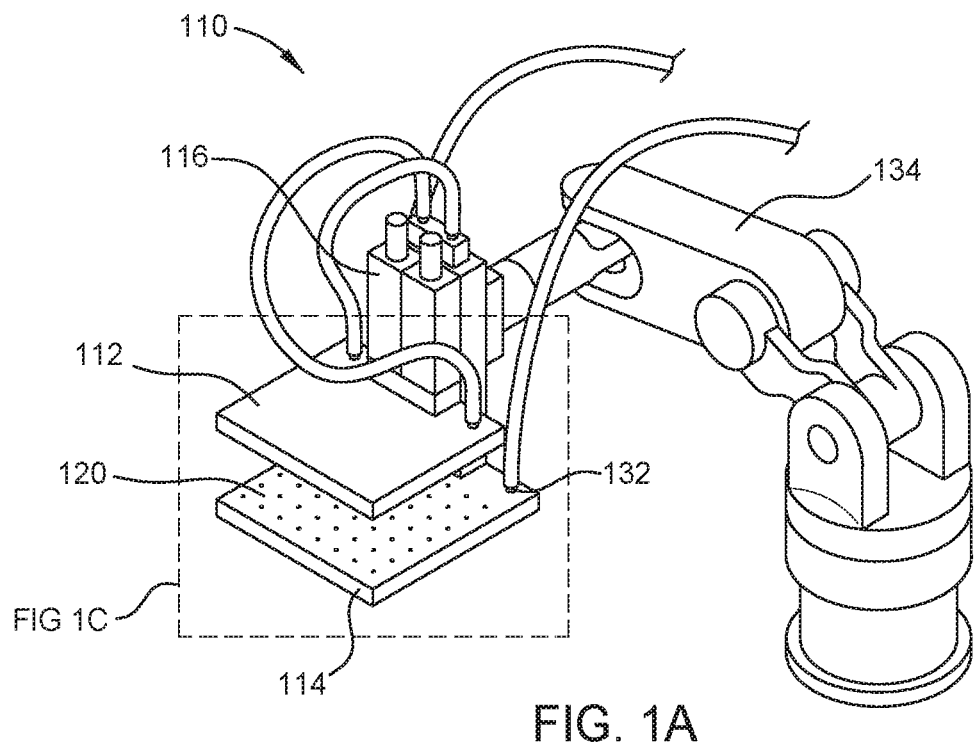
FIGS. 1A-1F are multiple views of an end effector in accordance with one or more embodiments of the present disclosure.

Conventional techniques for applying labels to various surfaces may be prone to error. For example, the label may not be effectively applied to the surface in a manner that ensures the label will remain in contact with the surface during use or transport, or the wrong label may even be applied to the surface. The present disclosure relates to a method and system for applying a label to a transport structure. The transport structure includes a plurality of storage containers secured thereto using one or more restraining members. An end effector is used to receive a label from a label dispenser and apply the label to the restraining member. The label includes information related to the storage containers, such as to facilitate identification or transport of the storage containers on the transport structure. The end effector includes a first plate and a second plate that are movable with respect to each other and are able to grasp the label. For example, the end effector may include or be operatively coupled to a pump to provide a suction force to grasp the label with the first plate and the second plate, and further are able to provide a discharge force to release the label with the first plate and the second plate. Further, the end effector is movable between the label dispenser and the transport structure to receive and apply the label.

According to one or more embodiments, a method of applying a label to a transport structure includes receiving the label from a label dispenser with an end effector, in which the label includes information related to a plurality of storage containers secured to the transport structure with a restraining member. The method further includes measuring a position of the end effector relative to an object, moving the end effector with the label to a target position based upon the measured position, and applying the label to the restraining member with the end effector. The method may continue with moving the end effector away from the storage containers, and transporting the transport structure with the storage containers and the label based upon the information of the label.

As mentioned above, the end effector includes a first plate and a second plate that are movable between an open position and a closed position. In the open position, the first plate and the second plate are spaced apart from each other, and in the closed position, the first plate and the second plate engage each other. Further, the label includes a front label portion and a back label portion. As such, the receiving the label from the label dispenser with the end effector may include positioning the first plate of the end effector adjacent the label dispenser with the end effector in the open position, dispensing the front label portion from the label dispenser, and grasping the front label portion with the first plate of the end effector. The receiving the label from the label dispenser with the end effector may further include positioning the second plate of the end effector adjacent the label dispenser, dispensing the back label portion from the label dispenser, and grasping the back label portion with the second plate of the end effector.

According to one or more embodiments, a method of applying a label to a transport structure includes determining, with a range-finding sensor, a position of a plurality of storage containers secured to the transport structure with a strap and positioning the end effector with the label between the storage containers and the strap, in which the end effector includes a first plate and a second plate and the label includes a front label portion and a back label portion. The method further includes moving the first plate and the second plate of the end effector from an open position to a closed position with the strap positioned between the front label portion and the back label portion, releasing the front label portion from the first plate and the back label portion from the second plate of the end effector to adhere the front label portion to the back label portion of the label, and moving the first plate and the second plate from the closed position to the open position with the strap remaining positioned between the front label portion and the back label portion.

Further, according to one or more other embodiments, a robotic work cell includes a label application station configured to receive a plurality of transport structures, in which each transport structure has a plurality of storage containers secured to a transport structure with a restraining member, and a label dispenser configured to dispense a label for each transport structure, in which each label includes information related to the storage containers secured to each of the respective transport structures. The robotic work cell further includes an end effector with an actuator operatively coupled thereto, in which the end effector is configured to receive each label from the label dispenser and apply each label to the respective restraining member, and a controller including instructions to move the end effector between the label dispenser and the label application station for the end effector to receive each label from the label dispenser and apply each label to the respective restraining member of the transport structure.

Figure 1B:
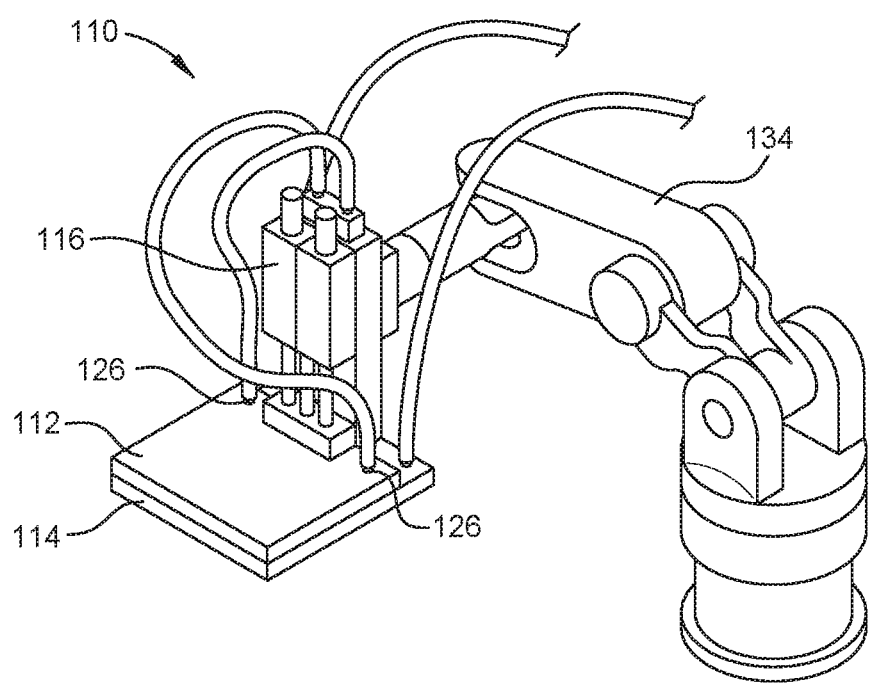
Figure 1C:
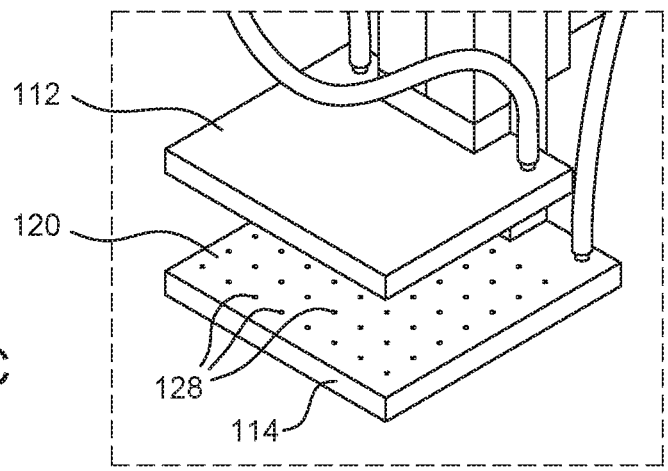
Figure 1D:
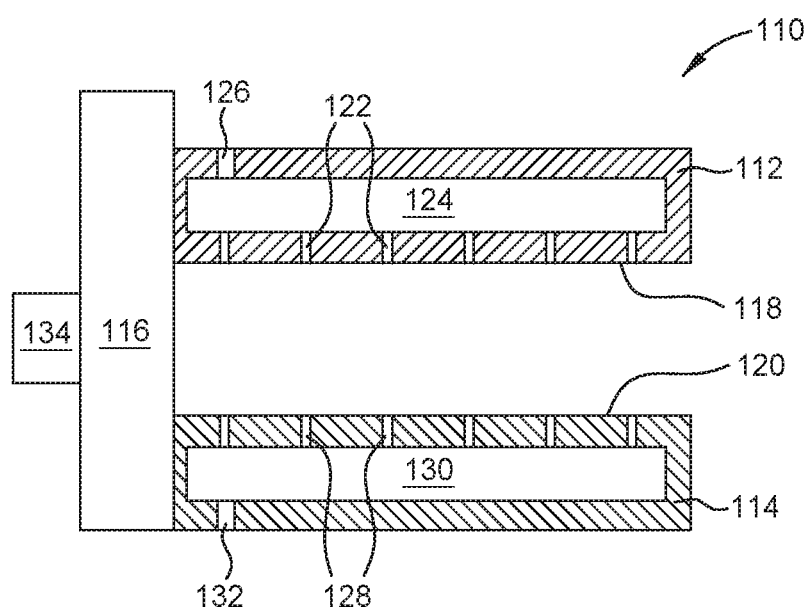
Figure 1E:
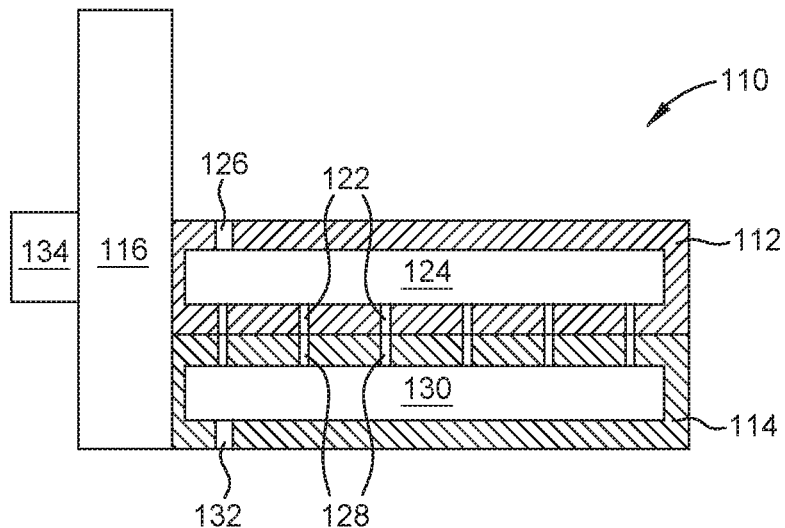
Figure 1F:
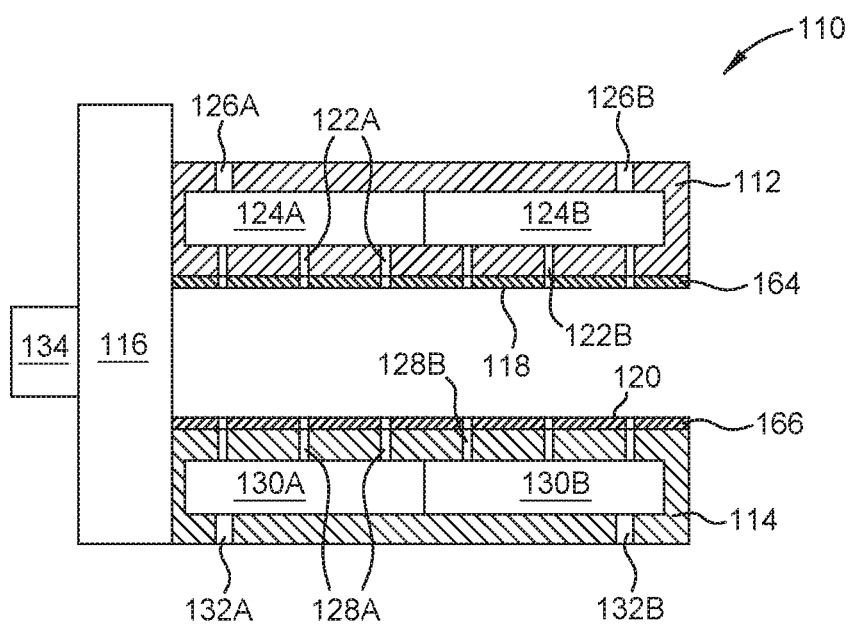

Referring now to FIGS. 1A-1F, multiple views of an end effector 110 in accordance with one or more embodiments of the present disclosure are shown. FIG. 1A shows an above perspective view of the end effector 110 in an open position, FIG. 1B shows an above perspective view of the end effector 110 in a closed position, and FIG. 1C shows a detailed view of the end effector 110. FIG. 1D shows a cross-sectional schematic view of the end effector 110 in the open position, and FIG. 1E shows a cross-sectional schematic view of the end effector 110 in the closed position. Further, FIG. 1F shows a cross-sectional schematic view of an alternate embodiment of the end effector 110. The end effector 110 is used for grasping and applying a label, such as to a restraining member of a transport structure.

The end effector 110 includes a first plate 112 (e.g., upper plate) and a second plate 114 (e.g., lower plate) that are movable with respect to each other between the open position and the closed position. The first plate 112 and the second plate 114 may be linearly movable with respect to each other between the open position and the closed position, as shown, such as movable along a substantially straight line with respect to each other. Additionally or alternatively, the first plate 112 and the second plate 114 may be rotationally movable with respect to each other between the open position and the closed position, such as movable about an axis with respect to each other. For example, the end effector 110 includes an actuator 116 operably coupled between the first plate 112 and the second plate 114 to move the first plate 112 and the second plate 114 with respect to each other. The actuator 116 may be actuatable according to any suitable means, such as pneumatic, hydraulic, mechanical, motorized, electrical, and so forth. Further, the actuator 116 may include an active and/or a passive actuator. Some non-limiting examples for the actuator 116 include a linear actuator (e.g., a piston and cylinder) to linearly move the first plate 112 and the second plate 114 with respect to each other, and a rotary actuator (e.g., a rack and pinion) to rotationally move the first plate 112 and the second plate 114 with respect to each other. In one embodiment, the actuator 116 includes a linear actuator coupled between the first plate 112 and the second plate 114, and moving the first plate 112 and the second plate 114 with respect to each other includes increasing a length of the linear actuator.

The first plate 112 and the second plate 114 are movable with respect to each other between the open position and the closed position. In the open position, the first plate 112 and the second plate 114 are spaced from each other, and in the closed position, the first plate 112 and the second plate 114 engage each other. The end effector 110 is able to receive a label when in the open position, and the end effector 110 is used to apply the label when in the closed position. For example, the label includes a front label portion and a back label portion that are applied to each other to form the label. The front label portion and the back label portion may be discrete and separate sections or portions that together may be used to form the label. Alternatively, the front label portion and the back label portion may be different sections of a monolithic structure used to form the label, such as by having the front label portion and the back label portion folded over to contact each other and form the label. The front label portion and/or the back label portion includes an adhesive side such that the front label portion and the back label portion are able to adhere or attach to each other. The first plate 112 is used to grasp and release the front label portion such that the non-adhesive side of the front label portion contacts a contact surface 118 of the first plate 112. The second plate 114 is used to grasp and release the front label portion such that the non-adhesive side of the back label portion contacts a contact surface 120 of the second plate 114. The first plate 112 and the second plate 114 move from the open position to the closed position such that adhesive sides of the front label portion and the back label portion contact and adhere to each other, thereby forming the label.

The first plate 112 and the second plate 114 may include one or more openings to facilitate grasping and releasing the label. For example, as best shown in FIGS. 1D and 1E, the first plate 112 includes one or more openings 122, a chamber 124, and one or more ports 126. The openings 122 are formed within the contact surface 118 of the first plate 112, and the openings 122 and the port 126 are in fluid communication with the chamber 124. A pump is operatively coupled to the first plate 112, and more specifically to the port 126, to provide a suction force (e.g., relative negative pressure) and/or a discharge force (e.g., relative positive pressure) through the chamber 124 and to the openings 122. When the pump provides a suction force to the port 126, the suction force is communicated through the openings 122 for the contact surface 118 of the first plate 112 to grasp the front label portion. When the pump provides a discharge force to the port 126, the discharge force is communicated through the openings 122 for the contact surface 118 of the first plate 112 to release and expel the front label portion therefrom.

Similarly, the second plate 114 includes one or more openings 128, a chamber 130, and one or more ports 132. The openings 128 are formed within the contact surface 120 of the second plate 114, and the openings 122 and the port 126 are in fluid communication with the chamber 124. A pump (e.g., the same pump discussed above with respect to the first plate 112 or a different pump) is operatively coupled to the second plate 114, and more specifically to the port 132, to provide a suction force and/or a discharge force through the chamber 130 and to the openings 128. When the pump provides a suction force to the port 132, the suction force is communicated through the openings 128 for the contact surface 120 of the second plate 114 to grasp the back label portion. When the pump provides a discharge force to the port 132, the discharge force is communicated through the openings 128 for the contact surface 120 of the second plate 114 to release and expel the back label portion therefrom.

The first plate 112 and/or the second plate 114 may include one or more features to facilitate even distribution of the suction force or the discharge force from the pump and across the openings of the first plate 112 and the second plate 114. The openings of the first plate 112 and the second plate 114 may be uniformly distributed across the contact surfaces of the first plate 112 and the second plate 114. The openings may also have substantially the same size or cross-sectional area with respect to each other. Further, multiple ports may be included within the first plate 112 and the second plate 114, in which the ports are positioned on opposite sides of the first plate 112 and the second plate 114 with respect to each other to facilitate distribution of the suction force or the discharge force. For example, as best shown in FIG. 1B, the ports 126 are formed on opposite sides of the first plate 112 to more evenly distribute the suction force or the discharge force from the pump, through the ports 126, and to the openings 122.

Referring still to FIGS. 1A-1F, one or more actuators 134 are included with or operatively coupled to the end effector 110 to move the end effector 110. The actuator 134 may have any suitable form, and may move and control the end effector 110 according to one or more degrees of freedom. For example, the actuator 134 may be used to translate and/or rotate the end effector 110. Some non-limiting examples of the actuator 134 include an articulating and/or telescoping robotic arm, as shown, in which the end effector 110 may attach to a distal end of the actuator 134.

In one or more embodiments, the openings 122 of the first plate 112 (and/or the openings 128 of the second plate 114) may be separately controllable with respect to each other. For example, a suction force and/or a discharge force (or different amounts of the forces) may be separately provided through a selected amount of the openings 122. With reference to FIG. 1F, the first plate 112 includes openings 122A and 122B that are separately controllable with respect to each other. The first plate 112 includes multiple chambers 124A and 124B and multiple ports 126A and 126B that are fluidly isolated from each other. The openings 122A and the port 126A are in fluid communication with the chamber 124A, and the openings 122B and the port 126B are in fluid communication with the chamber 124B.

A force (e.g., a suction force or a discharge force) may be provided through the port 126A and to the chamber 124A, and a separate force may be provided through the port 126B and to the chamber 124B. For example, one or more pumps may be used to provide the different forces to the ports 126A and 126B, such as by having separate pumps operably coupled to each port 126A and 126B, or the same pump through one or more control valves to the ports 126A and 126B. Thus, the force provided through the openings 122A may be different than the force provided through the openings 122B, such as by having a force provided to only one of openings 122A or 122B, or different amounts of forces provided to the openings 122A and 122B. By having the openings 122A and 122B separately controllable with respect to each other, the first plate 112 may be used to grasp and release label portions of different sizes and/or shapes. In an embodiment for a smaller label portion, only the openings 122B may be controlled or provided a suction force to grasp the smaller label portion, whereas the openings 122A are not provided a suction force, to facilitate the engagement between the first plate 112 and the smaller label portion. In an embodiment for a larger label portion, both of the openings 122A and 122B may be provided with a suction force to grasp the larger label portion to facilitate engagement between the first plate 112 and the larger label portion.

Similarly, the openings 128 of the second plate 114 may be separately controllable with respect to each other, in which a suction force and/or a discharge force (or different amounts of the forces) may be separately provided through a selected amount of the openings 128. With reference to FIG. 1F, the second plate 114 includes multiple openings 128A and 128B, multiple chambers 130A and 130B, and multiple ports 132A and 132B that are fluidly isolated from each other. The openings 128A and the port 132A are in fluid communication with the chamber 130A, and the openings 128B and the port 132B are in fluid communication with the chamber 130B. A force (e.g., a suction force or a discharge force) may be provided through the port 132A and to the chamber 130A, and a separate force may be provided through the port 132B and to the chamber 130B. For example, one or more pumps may be used to provide the different forces to the ports 132A and 132B, such as by having separate pumps operably coupled to each port 132A and 132B, or the same pump through one or more control valves to the ports 132A and 132B. Thus, the force provided through the openings 128A may be different than the force provided through the openings 128B to separately control the openings 128A and 128B with respect to each other.

Referring still to FIG. 1F, a soft material may be included with the first plate 112 and/or the second plate 114 to facilitate engagement between the label and the end effector 110. For example, a soft material layer 164 is positioned on the first plate 112 to form the contact surface 118, and a soft material layer 166 is positioned on the second plate 114 to form the contact surface 120. The soft material may include, for example, a compressible material and/or a pliable material. The soft material may include foam or a sponge-like material, such as polymeric foam including nitrile rubber foam, polyurethane foam, silicon foam, or polychloroprene foam. Other examples include an elastomeric material, such as latex, rubber, or silicone. In order to create a desired suction at the respective contact surfaces, the soft material may be provisioned with a plurality of holes (e.g., such as by drilling through the soft material) that allow fluid communication from the contact surfaces to the respective openings 122/128. If the soft material is sufficiently fluid permeable, provisioning the soft surfaces with additional holes may not be necessary. The soft material may increase the ability of the first plate 112 and the second plate 114 to apply a label, such as by facilitating engagement between the contact surface 118 and the contact surface 120 with a restraining member when applying the label.

Figure 2:
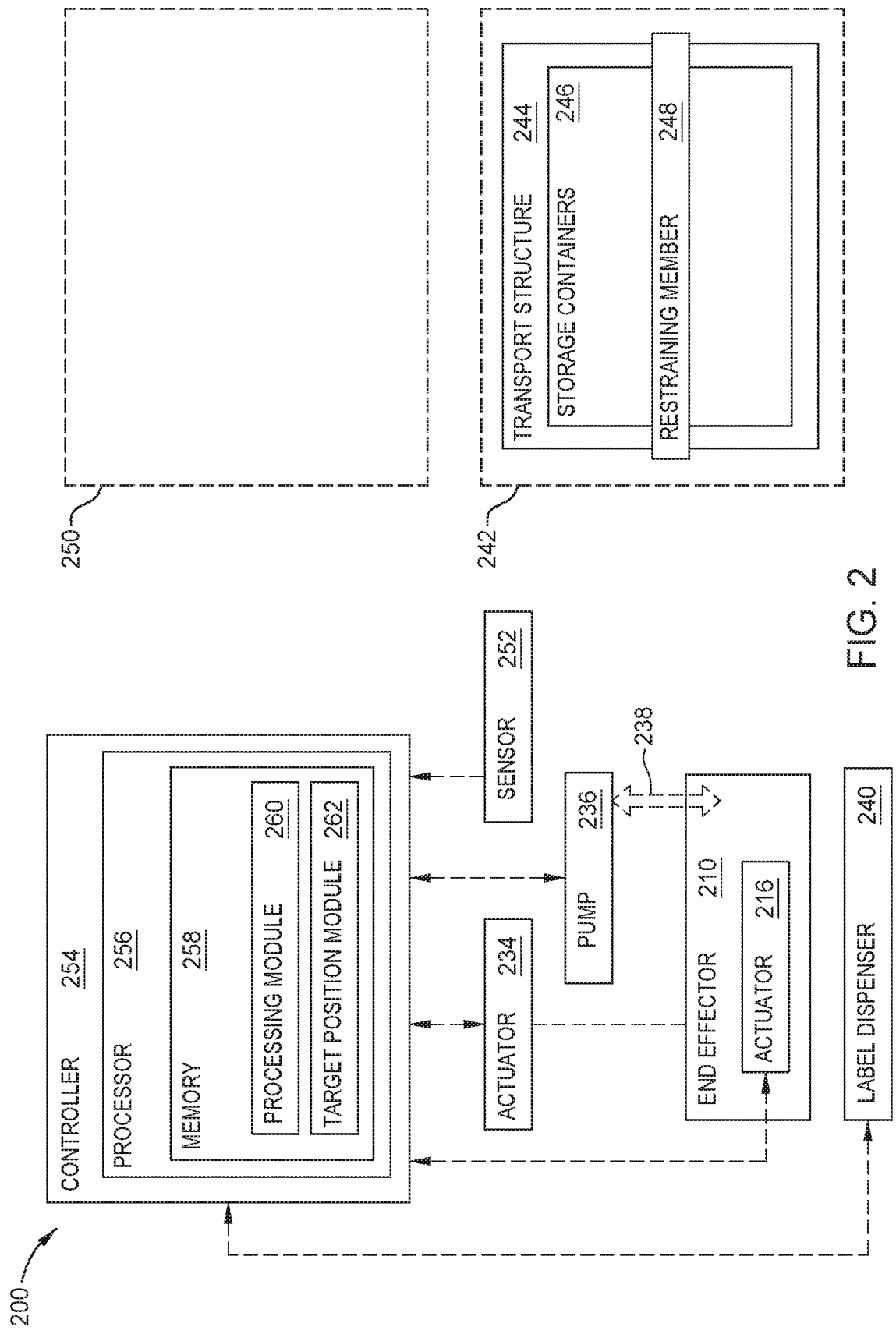
FIG. 2 is a schematic view of a robotic work cell including an end effector for applying a label in accordance with one or more embodiments of the present disclosure.

Referring now to FIG. 2, a schematic view of a robotic work cell 200 to apply a label using an end effector 210 in accordance with one or more embodiments of the present disclosure is shown. As discussed above, the end effector 210 includes an actuator 216, such as to move a first plate and a second plate of the end effector 210 with respect to each other. A pump 236 is operatively coupled to the end effector 210 to provide a force 238, and more particularly a suction force or a discharge force, through the openings of the first plate and the second plate of the end effector 210. Further, an actuator 234 is shown operatively coupled to the end effector 210 to move the end effector 210 within the robotic work cell 200.

The robotic work cell 200, as shown, includes a label dispenser 240 and a label application station 242. The label dispenser 240 is used to dispense labels therefrom, and the end effector 210 receives the labels from the label dispenser 240 and applies the labels within the label application station 242. Thus, the end effector 210 is able to move between the label dispenser 240 and the label application station 242 using the actuator 234.

The label application station 242 is shown as including a transport structure 244, one or more storage containers 246, and a restraining member 248. In accordance with one or more embodiments, the transport structure 244 is used to support one or more storage containers 246 for transportation. The transport structure 244 may include, for example, a pallet, and the storage containers 246 may include, for example, bins or totes. Each of the storage containers 246 is used to store one or more items therein with the storage containers 246 positioned upon or supported by the transport structure 244 for transportation. Further, the storage containers 246 are secured to the transport structure 244 with the restraining member 248. In the examples discussed above, the restraining member 248 includes a strap, but the present disclosure is not so limited, and may further include a band, a netting, or even a rigid structure.

In one or more embodiment, the end effector 210 may be used to apply the labels to the restraining member 248 within the label application station 242. The robotic work cell 200 may also be used for other activities and/or include one or more stations in addition to the label application station 242. For example, the label application station 242 may be used as the designated station for the transport structure 244 to be received within to apply the label to the restraining member 248 with the end effector 210. The label application station 242 may also be used for arranging the storage containers 246 on the transport structure 244 and/or securing the storage containers 246 to the transport structure 244 with the restraining member 248.

Alternatively, the robotic work cell 200 may include one or more stations 250, such as in addition to the label application station 242, for one or more of the above activities. For example, the station 250 may be a container arrangement station that receives the transport structure 244 and the storage containers 246 separately and arranges the storage containers 246 on the transport structure 244. Additionally or alternatively, the station 250 may be a restraining station to secure the storage containers 246 to the transport structure 244 with the restraining member 248. In such an embodiment, the restraining station may include, for example, a strapping or a banding machine, in which the strapping machine may be used to apply the strap around the storage containers 246 and the transport structure 244 together to secure the storage containers 246 to the transport structure 244 with the strap. If multiple stations are included within the robotic work cell 200, as shown, the transport structure 244 and the storage containers 246 may be moved between the respective stations, such as through manual or automated means. Accordingly, the present disclosure contemplates the robotic work cell 200 including one or more additional stations or activities than those discussed above.

The label that is applied to the restraining member 248 with the end effector 210 includes information related to the storage containers 246. For example, the information of the label, which may be in the form of a code (e.g., a barcode), may specify a quantity of storage containers 246 on the transport structure 244, or may specify products included within one or more of the storage containers 246. In one embodiment, if one or more of the storage containers 246 includes a hazardous material, the label may include information that indicates hazardous material is secured to the transport structure 244. The label may also include information that specifies a destination for transport of the storage containers 246 and the transport structure 244. In such an embodiment, the information of the label may include an address or a building number related to a destination for the transport structure 244 such that the storage containers 246 are transported to the destination in accordance with the information provided on the label.

Further, in one embodiment, the storage containers 246 may each include an individual tag or identification. The tag of the storage containers 246 may be identified or scanned to generate the information of the label before the label is applied to the restraining member 248. The label dispenser 240 may be used to generate and/or print the information on the label, or a printer operatively coupled to the label dispenser 240 may print the information on the label to provide the label to the label dispenser.

Referring still to FIG. 2, the robotic work cell 200 includes a sensor 252, such as a range-finding sensor (e.g., a laser), to measure a position of an object within the robotic work cell 200. For example, the sensor 252 may be used to measure a position of the transport structure 244, one or more of the storage containers 246, and/or the restraining member 248. The position measured by the sensor 252 may be used to move the end effector 210 to a target position, such as with respect to the restraining member 248. The sensor 252 may be positioned upon or coupled to the end effector 210, or may be otherwise positioned within the robotic work cell 200. After the sensor 252 measures the position of the object, the end effector 210 may be moved to the target position, such as within a predetermined distance of the restraining member 248, to enable the end effector 210 to properly apply the label to the restraining member 248.

A controller 254 is further included in the robotic work cell 200 to interface with and control the end effector 210. The controller 254 may interface and control the end effector 210 through the actuator 216, the actuator 234, and/or the pump 236, as shown. The controller 254 includes a computer processor 256 and a memory 258. The computer processor 256 represents any number of processing elements that each may include any number of processing cores. Some non-limiting examples of the computer processor 256 includes a microprocessor, a digital signal processor (DSP), an application-specific integrated chip (ASIC), and a field programmable gate array (FPGA), or combinations thereof. The memory 258 may include volatile memory elements (such as random access memory), non-volatile memory elements (such as solid-state, magnetic, optical, or Flash-based storage), and combinations thereof. Moreover, the memory 258 may be distributed across different mediums (e.g., network storage or external hard drives).

As shown, the memory 258 may include one or more "modules" for performing various functions described herein. In one embodiment, each module includes program code that is executable by the computer processor 256. However, other embodiments may include modules that are partially or fully implemented in hardware (i.e., circuitry) or firmware of the controller 254. As shown, the memory 258 includes a processing module 260, such as to perform processing of the input received from the sensor 252 in the environment. The input from the sensor 252 may have any suitable form, such as a measurement or even an image received from the sensor 252. Further, the memory 258 includes a target position module 262, such as to perform processing to position the end effector 210 in the target position within the robotic work cell 200.

The modules of the memory 258 may be used to locate an object within the robotic work cell 200 (e.g., the transport structure 244, the storage containers 246, and/or the restraining member 248 within the robotic work cell 200). The modules may also be used to determine the target position and/or orientation of the end effector 210 relative to the label dispenser 240 and/or the object within the robotic work cell 200. Further, the modules of the memory 258 may include one or more predefined rules, such as when and where to move the end effector 210 within the robotic work cell 200. An example of one rule may be to not dispense the label from the label dispenser 240 until the end effector 210 is in a proper position and/or orientation with respect to the label dispenser 240. Another example of a rule may be to not move the end effector 210 away from the label application station 242 until the processor 256 determines or verifies that the end effector 210 properly applied the label to the restraining member 248.

In one or more embodiments, the controller 254 is used to provide one or more control signals to one or more components within the robotic work cell 200. For example, the controller 254 is used to provide control signals to the actuator 216 of the end effector 210 to move the first plate and the second plate of the end effector 210 between the open position and the closed position. The controller 254 is also used to provide one or more control signals to enable the end effector 210 to receive the label from the label dispenser 240 and apply the label to the label to the restraining member 248. For example, the controller 254 provides control signals for the end effector 210 to grasp and release the label. In such an embodiment, the controller 254 provides the control signals to the pump 236 to provide the force 238 (e.g., a suction force or a discharge force) through the holes of the first plate and the second plate of the end effector 210. A control signal may be used to provide a suction force with the pump 236 through the holes of the first plate to grasp the front label portion with the first plate, and another control signal may be used to provide a suction force with the pump 236 through the holes of the second plate to grasp the back label portion with the second plate. Similarly, a control signal may be used to provide a discharge force with the pump 236 through the holes of the first plate to release the front label portion from the first plate, and another control signal may be used to provide a discharge force with the pump 236 through the holes of the second plate to release the back label portion from the second plate.

In one or more embodiments, the controller 254 also is used to provide control signals to the actuator 234 to move and orient the end effector 210 within the robotic work cell 200. The control signals enable the actuator 234 to move the end effector 210 between the label dispenser 240 and the label application station 242. The control signals are enable the actuator 234 to orient the end effector 210 with respect to the label dispenser 240 and/or the label application station 242. For example, control signals is used by the actuator 234 to position and orient the end effector 210 with respect to the label dispenser 240 such that the first plate of the end effector 210 is able to grasp the front label portion and/or the second plate of the end effector 210 is able to grasp the back label portion. Further, control signals are used by the actuator 234 to position the end effector 210 in the target position with respect to the label application station 242 for the end effector 210 to apply the label to the restraining member 248.

Furthermore, in one or more embodiments, the controller 254 is used to provide control signals to the label dispenser 240 to dispense labels from the label dispenser 240. For example, the controller 254 may provide a control signal to the label dispenser 240 to dispense the front label portion when the first plate of the end effector 210 is adjacent and in proper orientation and alignment to grasp the front label portion. Similarly, the controller 254 may provide a control signal to the label dispenser 240 to dispense the back label portion when the second plate of the end effector 210 is adjacent and in proper orientation and alignment to grasp the back label portion. The controller 254 may also be used to provide one or more control signals to other components not specifically included within the robotic work cell 200, and/or may include additional inputs and outputs than those shown in FIG. 2, such as to incorporate the robotic work cell 200 within an overall larger system.

Referring now to FIGS. 3A-3K, multiple perspective views of an end effector 310 used to apply a label to a restraining member 358 in accordance with one or more embodiments of the present disclosure are shown. In particular, FIGS. 3A-3K provide an example sequence or method of use of the end effector 310 within a robotic work cell in accordance with the present disclosure.

Figure 3A:
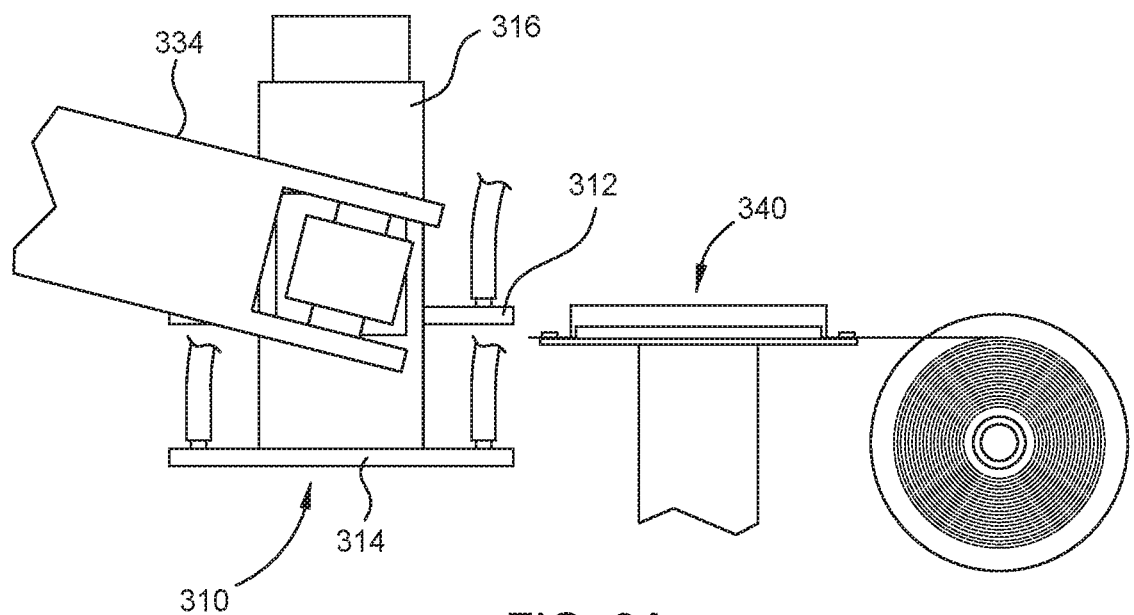
FIGS. 3A-3K are multiple perspective views of an end effector used to apply a label to a restraining member in accordance with one or more embodiments of the present disclosure.
Figure 3B:
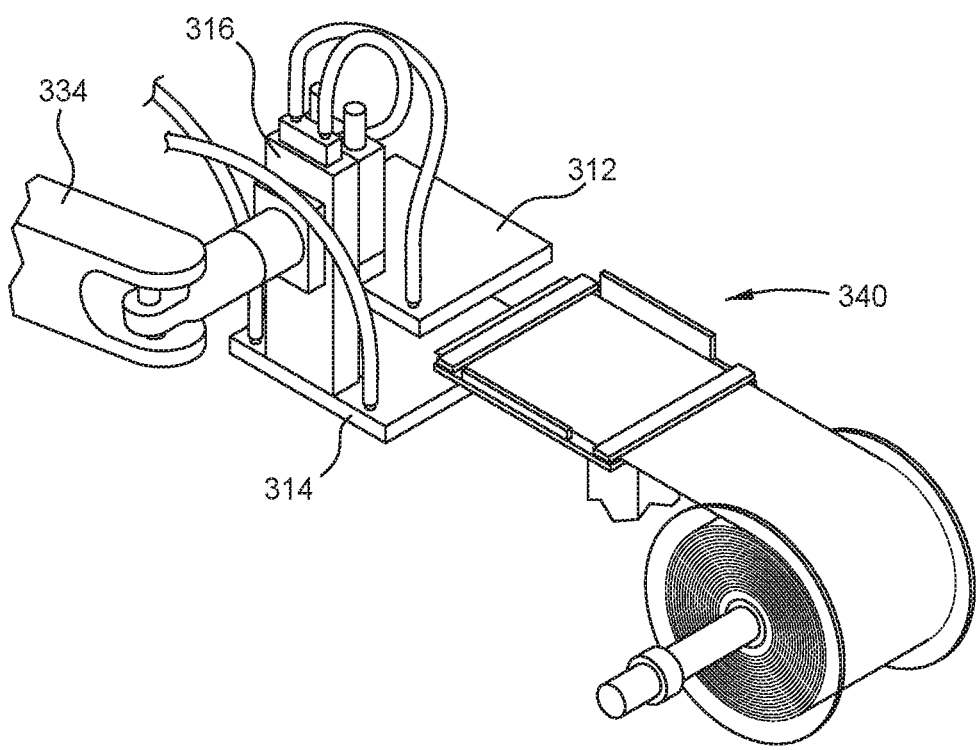

FIGS. 3A and 3B show the end effector 310 positioned adjacent a label dispenser 340. The end effector 310 is positioned in the open position with the actuator 316, and a first plate 312 of the end effector 310 is positioned adjacent the label dispenser 340 with the actuator 334. With the first plate 312 of the end effector 310 in the proper position and orientation with respect to the label dispenser 340, the label dispenser 340 is used to dispense the front label portion therefrom. The first plate 312 grasps the front label portion from the label dispenser 340, such as by providing a suction force through the openings of the first plate 312 for the front label portion to be grasped and remain in contact with the contact surface of the first plate 312.

In one or more embodiments, the first plate 312 of the end effector 310 may be used to verify that the label has been grasped from the end effector 310. For example, the pump provides a suction force through the holes of the first plate 312 to grasp and suction the label to the first plate 312. If resistance to the suction force, such as below a predetermined amount of resistance, is measured through the holes of the first plate 312, it may be determined that the respective label portion was not properly grasped by the first plate 312. In such an embodiment, the end effector 310 may again attempt to grasp the label. Additionally or alternatively, an alarm signal may be generated to notify that the end effector 310 has not properly received or grasped the label. Otherwise, if above a predetermined amount of resistance is measured through the holes of the first plate 312, it may be determined that the respective label portion was grasped by the first plate 312.

Figure 3C:
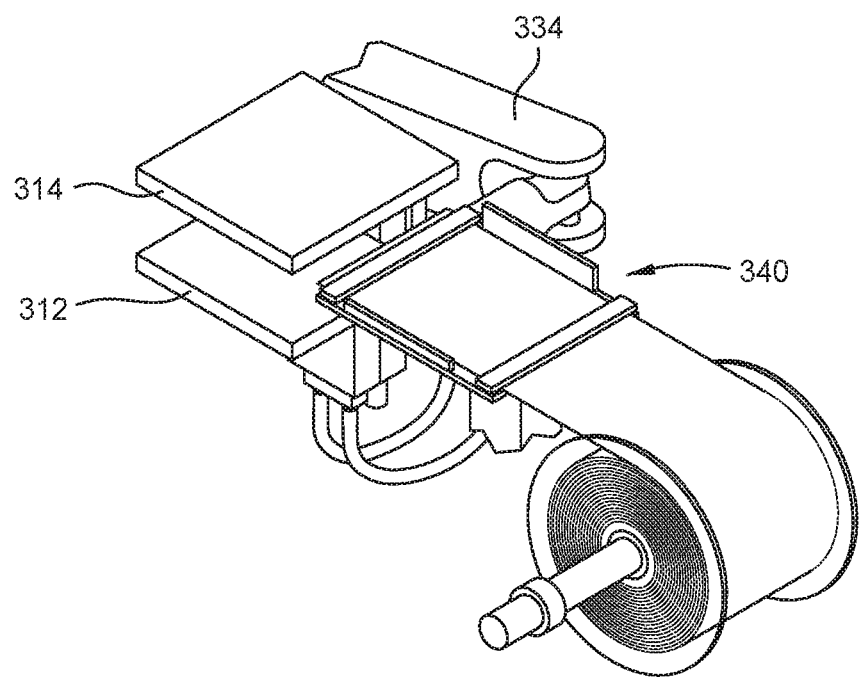

As shown in FIG. 3C, after the first plate 312 receives grasps the front label portion from the label dispenser 340, the end effector 310 is positioned or reoriented with respect to the label dispenser 340 with the actuator 334. The actuator 334 moves the second plate 314 to the proper position and orientation with respect to the label dispenser 340, in which the label dispenser 340 dispenses the back label portion therefrom. The second plate 314 grasps the back label portion from the label dispenser 340, such as by providing a suction force through the openings of the second plate 314 for the back label portion to be grasped and remain in contact with the contact surface of the second plate 314.

Similarly to the first plate 312, in one or more embodiments, the second plate 314 of the end effector 310 may be used to verify that the label has been grasped from the end effector 310. For example, the pump provides a suction force through the holes of the second plate 314 to grasp and suction the label to the second plate 314. If resistance to the suction force, such as below a predetermined amount of resistance, is measured through the holes of the second plate 314, it may be determined that the respective label portion was not properly grasped by the second plate 314. In such an embodiment, the end effector 310 may again attempt to grasp the label. Additionally or alternatively, an alarm signal may be generated to notify that the end effector 310 has not properly received or grasped the label. Otherwise, if above a predetermined amount of resistance is measured through the holes of the second plate 314, it may be determined that the respective label portion was grasped by the second plate 314.

Figure 3D:
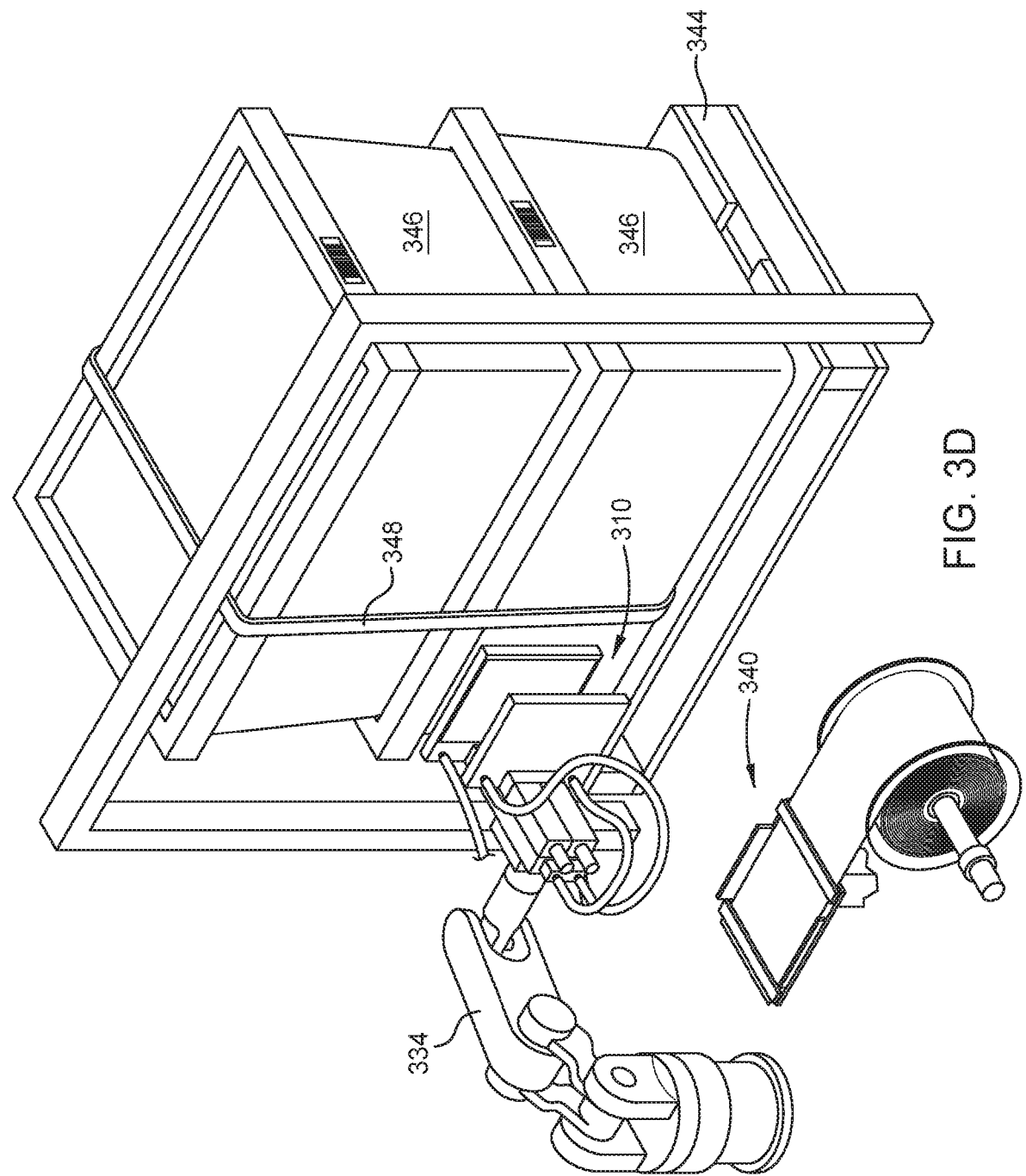
Figure 3E:
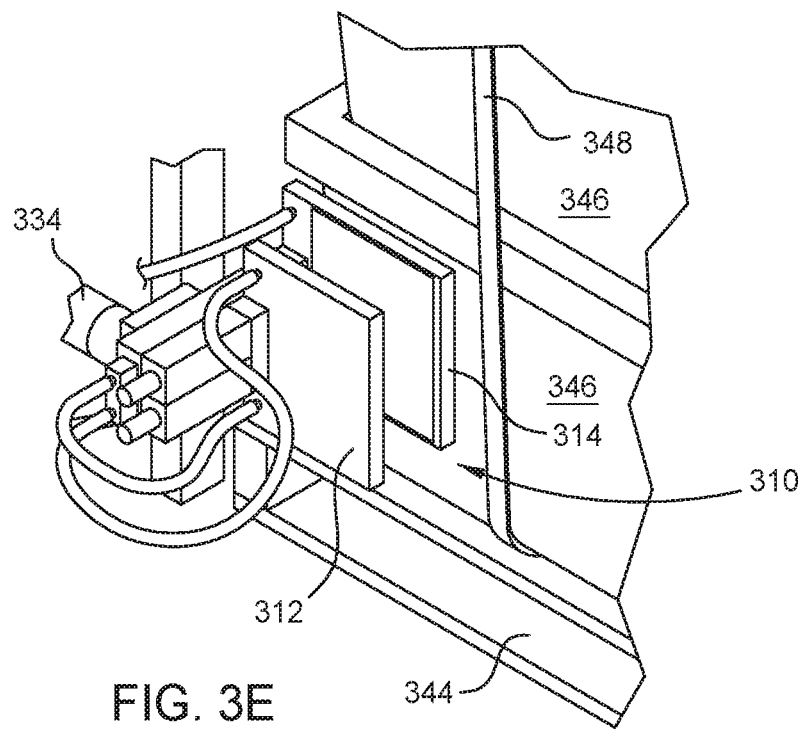

After the end effector 310 receives the label from the label dispenser 340, the end effector 310 moves with the label to a target position with the actuator 334. FIGS. 3D and 3E show storage containers 346 positioned upon a transport structure 344 and secured to the transport structure 344 with a restraining member 348. The restraining member 348 in this embodiment is shown as a strap. The end effector 310 is moved to a target position with respect to the storage containers 346, the transport structure 344, and/or the restraining member 348 with the actuator 334. For example, the end effector 310 is moved to a predetermined distance from to the storage containers 346 (e.g., about 0.25 inches to about 1 inch from the storage containers 346) with the second plate 314 of the end effector 310 positioned closer to the storage containers 346 than the first plate 312 of the end effector 310.

Figure 3F:
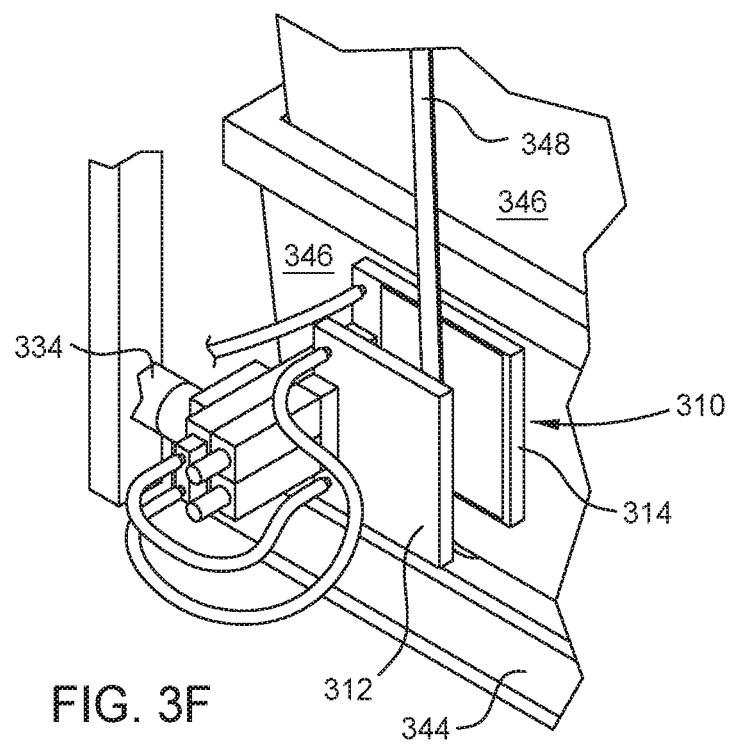

As shown in FIG. 3F, the end effector 310, still with the label, is positioned between the storage containers 346 and the restraining member 348 with the actuator 334. A gap is formed between the restraining member 348 and the storage containers 346, in which the end effector 310, and more particularly the second plate 314 of the end effector 310, is positioned in the gap between the restraining member 348 and the storage containers 346. The position of the end effector 310 relative to the restraining member 348 in FIG. 3F may demonstrate one example of a proper label application position for the end effector 310, such as with the restraining member 348 positioned between the first plate 312 and the second plate 314 of the end effector 310.

Figure 3G:
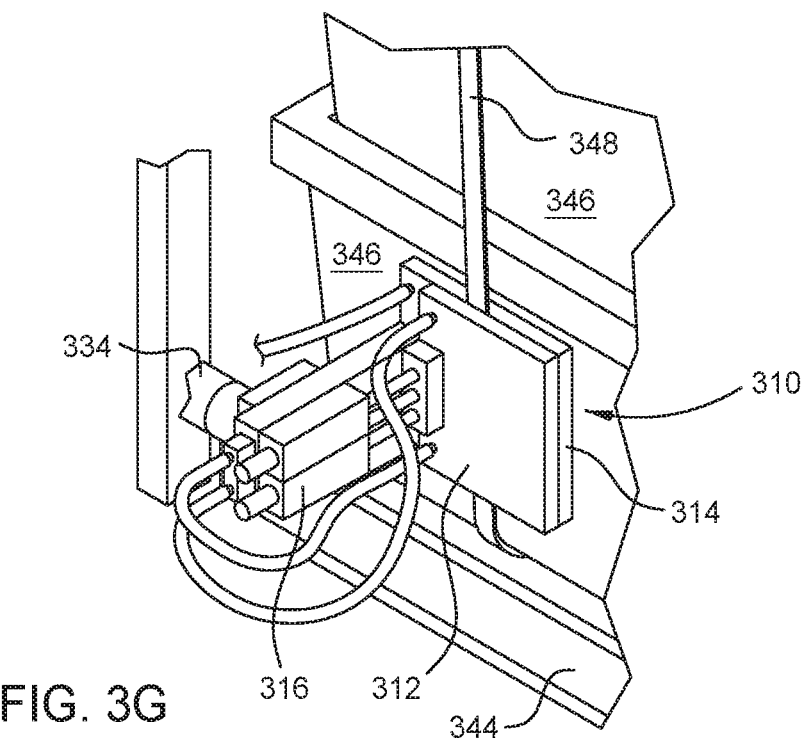

With the restraining member 348 in position between the first plate 312 and the second plate 314 of the end effector 310, the first plate 312 and the second plate 314 moves from the open position to the closed position with the actuator 316. FIG. 3G shows the first plate 312 and the second plate 314 in the closed position and engaged each other. As such, the first label portion and the second label portion are able contact and adhere to each other to apply the label to the restraining member 348. To further facilitate applying the label to the restraining member 348, the first plate 312 releases the front label portion, such as by providing a discharge force through the openings of the first plate 312, and the second plate 314 releases the back label portion, such as by providing a discharge force through the openings of the second plate 314.

Figure 3H:
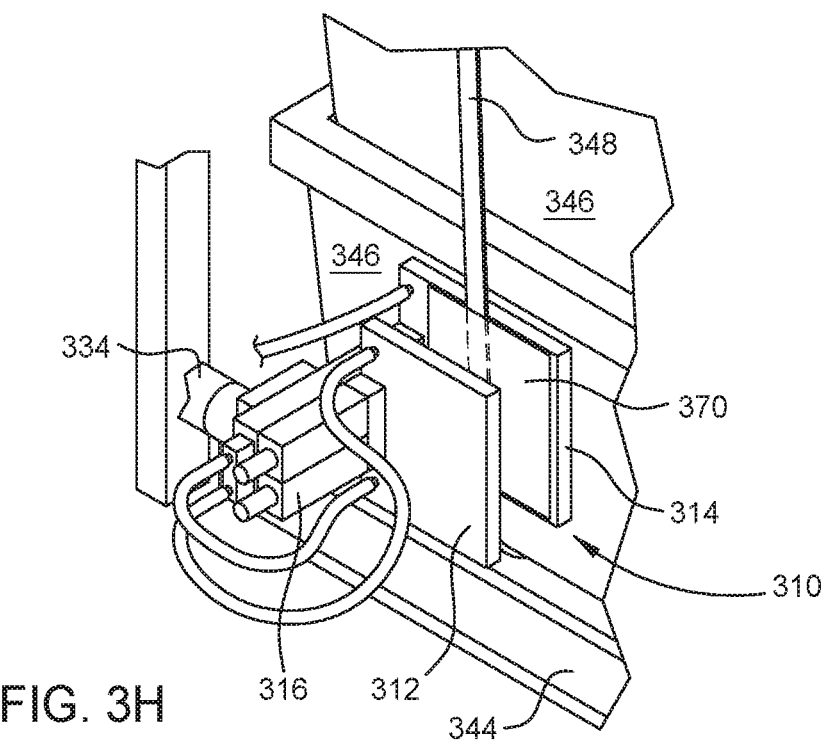

As shown in FIG. 3H, the first plate 312 and the second plate 314 move back from the open position to the closed position with the actuator 316. The label 370 applied to the restraining member 348 is also shown in FIG. 3H. In one or more embodiments, the end effector 310 may be used to verify that the label 370 has been discharged from the end effector 310 and applied to the restraining member 348. For example, the pump may provide a force (e.g., a suction force) through the holes of the first plate 312 and the second plate 314. If resistance to the suction force, such as above a predetermined amount of resistance, is measured through the holes of the first plate 312 or the second plate 314, it may be determined that the respective label portion was not discharged from the first plate 312 or the second plate 314. In such an embodiment, the end effector 310 may attempt to reapply the label 370 to the restraining member 348, such as by moving from the open position to the closed position in FIG. 3G. Additionally or alternatively, an alarm signal may be generated to notify that the end effector 310 has not properly applied the label 370. Otherwise, if below a predetermined amount of resistance is measured through the holes of the first plate 312 or the second plate 314, it may be determined that the respective label portion was discharged from the first plate 312 and the second plate 314 and the label 370 was successfully applied to the restraining member 348.

Figure 3I:
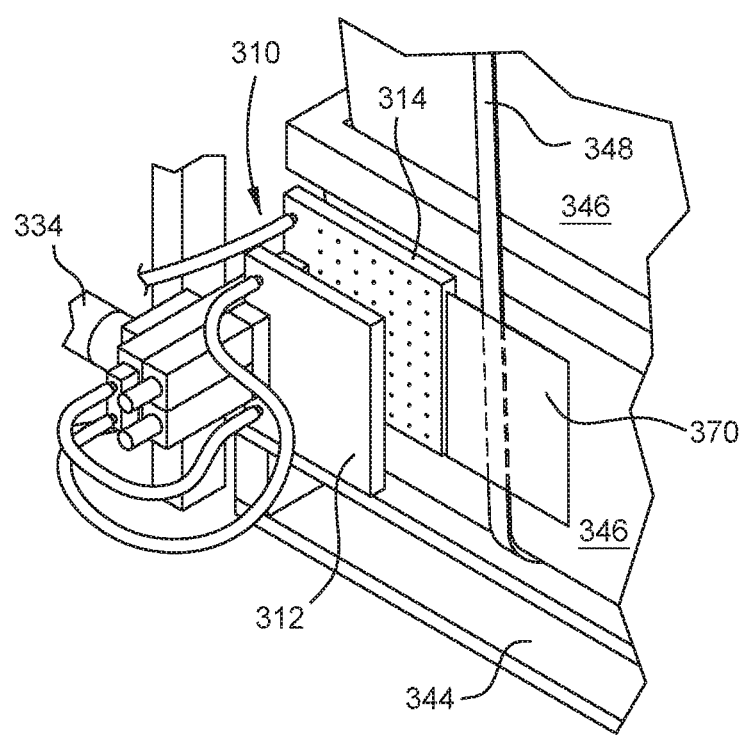

As shown in FIG. 3I, once the label 370 is applied to the restraining member 348 with the end effector 310, the end effector 310 may move away from the label 370 and the restraining member 348 and the storage containers 346 with the actuator 334. FIG. 3I shows the label 370 applied to the restraining member 348 with the end effector 310 moved such that the restraining member 348 is no longer positioned adjacent or between the first plate 312 and the second plate 314 of the end effector 310. The end effector 310 may continue to be moved away from the storage containers 346, such as for the end effector 310 to receive another label from the label dispenser 340. Further, the transport structure 344, with the storage containers 346 secured thereto, is transported to the destination, such as based upon the information included upon the label 370.

Figure 3J:
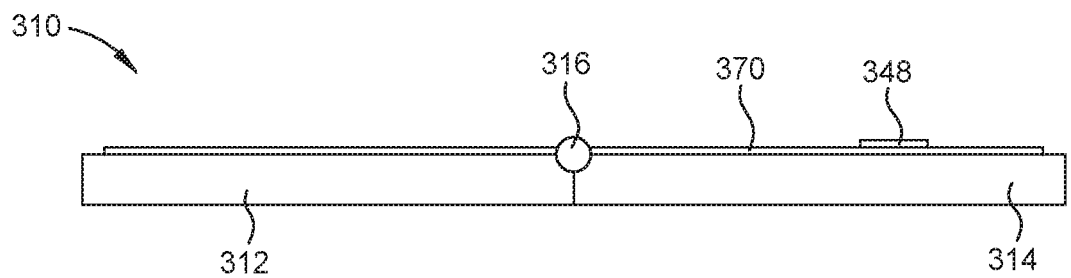
Figure 3K:
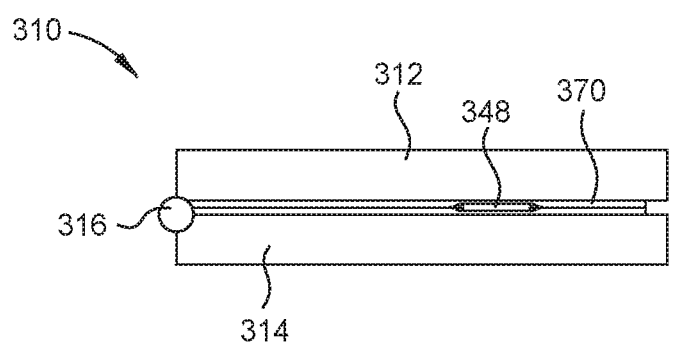

As discussed above, the first plate 312 and the second plate 314 of the end effector 310 may linearly move and/or rotationally move with respect to each other between the open position and the closed position to apply the label 370. For example, as shown in FIGS. 3A-3I, the first plate 312 and the second plate 314 linearly move with respect to each other. However, as shown in FIGS. 3J and 3K, the first plate 312 and the second plate 314 of the end effector 310 may rotationally move with respect to each other between the open position and the closed position. FIG. 3J shows the end effector 310 in the open position with the label 370 received upon the first plate 312 and the second plate 314. The first plate 312 and the second plate 314 rotate with respect to each other, such as about an axis of the actuator 316, to move to the closed position shown in FIG. 3K. In FIG. 3K, the end effector 310 is used to apply the label 370 to the restraining member 348. As discussed above, the label 370 includes a front label portion and a back label portion. The label portions may be discrete and separate to form the label, or the label portions may be different sections of a monolithic structure to form the label. FIGS. 3J and 3K show an example of the end effector 310 that may be used to apply a label with a monolithic structure by folding the label portions on top of each other.

Figure 4:
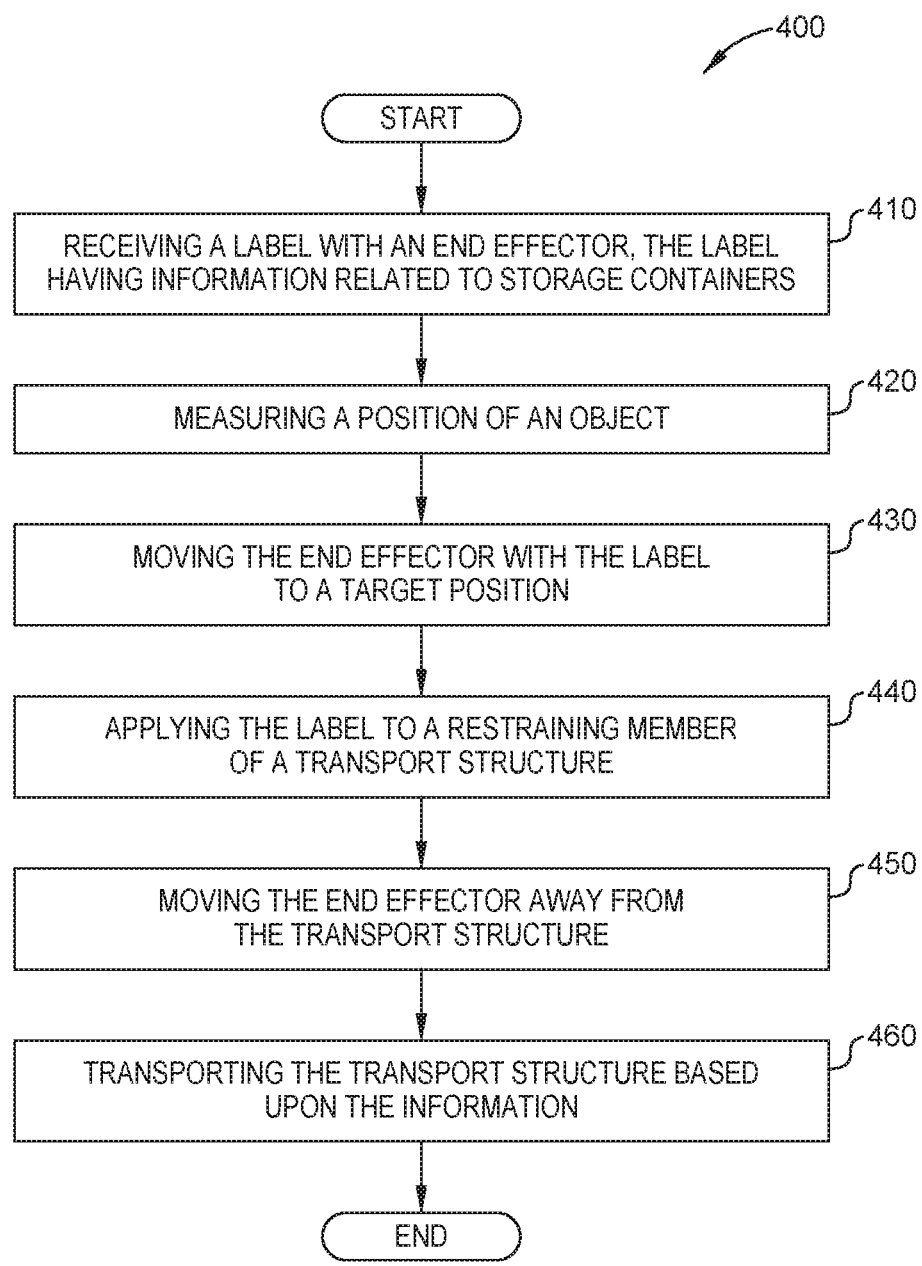
FIG. 4 is a method of applying a label to a transport structure in accordance with one or more embodiments of the present disclosure.

Referring now to FIG. 4, a method 400 of applying a label to a transport structure in accordance with one or more embodiments the present disclosure is shown. The method 400 begins at block 410 with an end effector receiving a label, such as from a label dispenser. The label includes information related to storage containers that are secured to the transport structure with a restraining device. At block 420, a position of an object is measured, such as with respect to the position of the end effector. A range-finding sensor measures the position of the object, such as the position of the storage containers, the transport structure, or the restraining device. At block 430, the end effector with the label is moved to a target position based upon the measured position. For example, the end effector is moved to a predetermined distance from the object such that the end effector is in a proper position and/or orientation with respect to the restraining member. At block 440, the label is applied to the restraining member with the end effector. As discussed above, the end effector applies the label to the restraining member by moving from the open position to the closed position with a front label portion and a back label portion grasped by a first plate and a second plate of the end effector, respectively. After the label is applied to the restraining member, the method 400 continues with block 450 by moving the end effector away from the storage containers. At block 460, the transport structure with the storage containers and the label is transported based upon the information on the label. The method 400 ends following completion of block 460.

Figure 5:
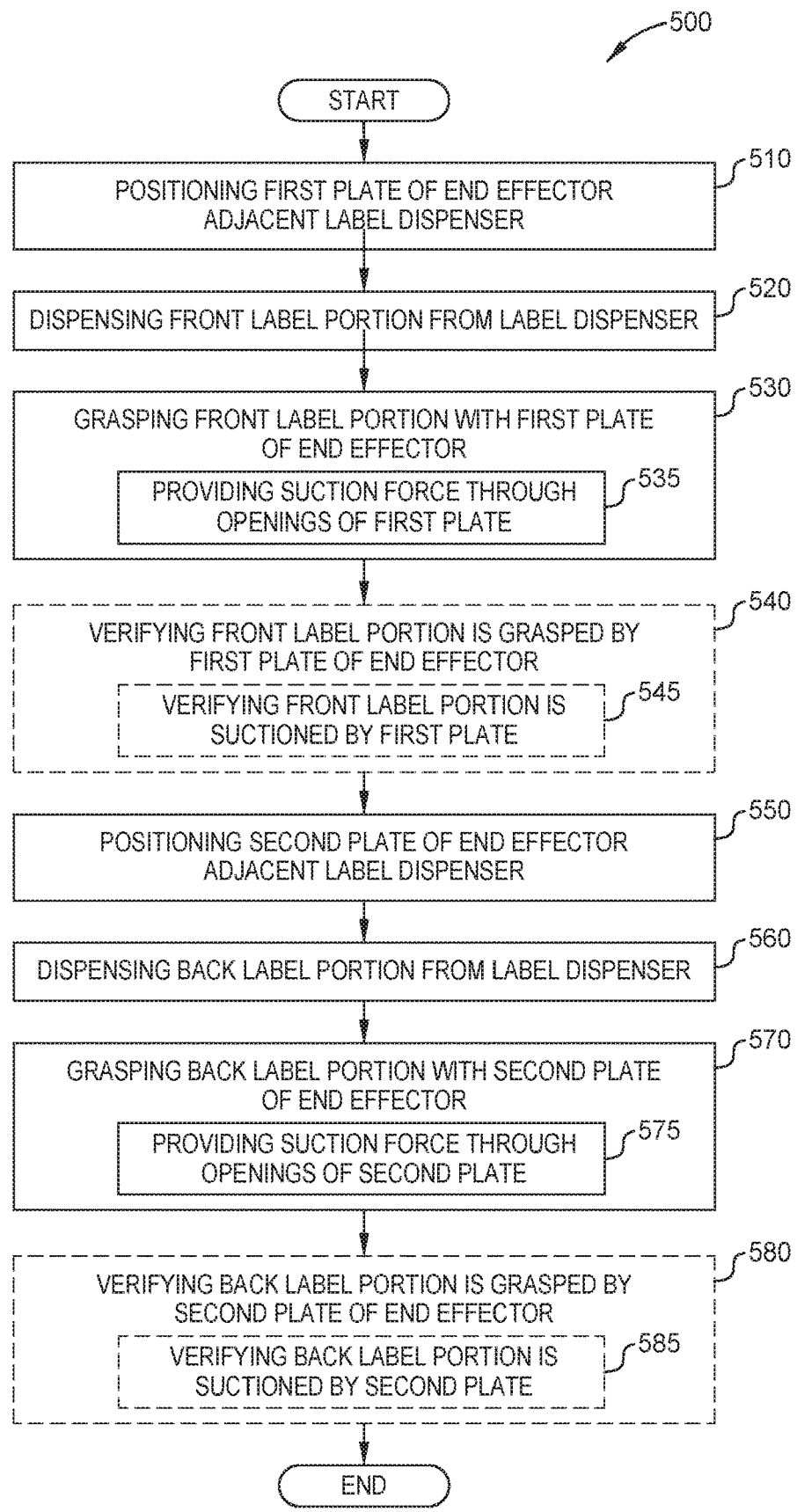
FIG. 5 is a method of receiving a label from a label dispenser with an end effector in accordance with one or more embodiments of the present disclosure.

Referring to FIG. 5, a method 500 of receiving a label with an end effector in accordance with one or more embodiments the present disclosure is shown. The method 500 begins at block 510 by positioned a first plate of the end effector adjacent a label dispenser. Once the first plate is in the proper position and orientation with respect to the label dispenser, the method 500 includes dispensing a front label portion of a label from the label dispenser at block 520. At block 530, the front label portion is grasped from the label dispenser with the first plate of the end effector. In particular, block 530 includes block 535 of providing a suction force through the openings of the first plate for the first plate to grasp the front label portion with the suction force. Optionally, the method 500 may include block 540. At block 540, the first plate of the end effector may verify that the front label portion is grasped. Block 540 may specifically include block 545 of verifying that the front label portion is suctioned by the first plate, such as by determining that the front label portion is providing resistance to the suction force provided to the openings of the first plate. At block 550, a second plate of the end effector is positioned adjacent the label dispenser. Once the second plate is in the proper position and orientation with respect to the label dispenser, the method 500 includes dispensing a back label portion of the label from the label dispenser at block 560. At block 570, the back label portion is grasped from the label dispenser with the second plate of the end effector. As shown, block 570 includes block 575 of providing a suction force through the openings of the second plate for the second plate to grasp the back label portion with the suction force. Optionally, the method 500 may include block 580. At block 580, the second plate of the end effector may verify that the back label portion is grasped. Block 580 may specifically include block 585 of verifying that the back label portion is suctioned by the second plate, such as by determining that the back label portion is providing resistance to the suction force provided to the openings of the second plate.

Figure 6:
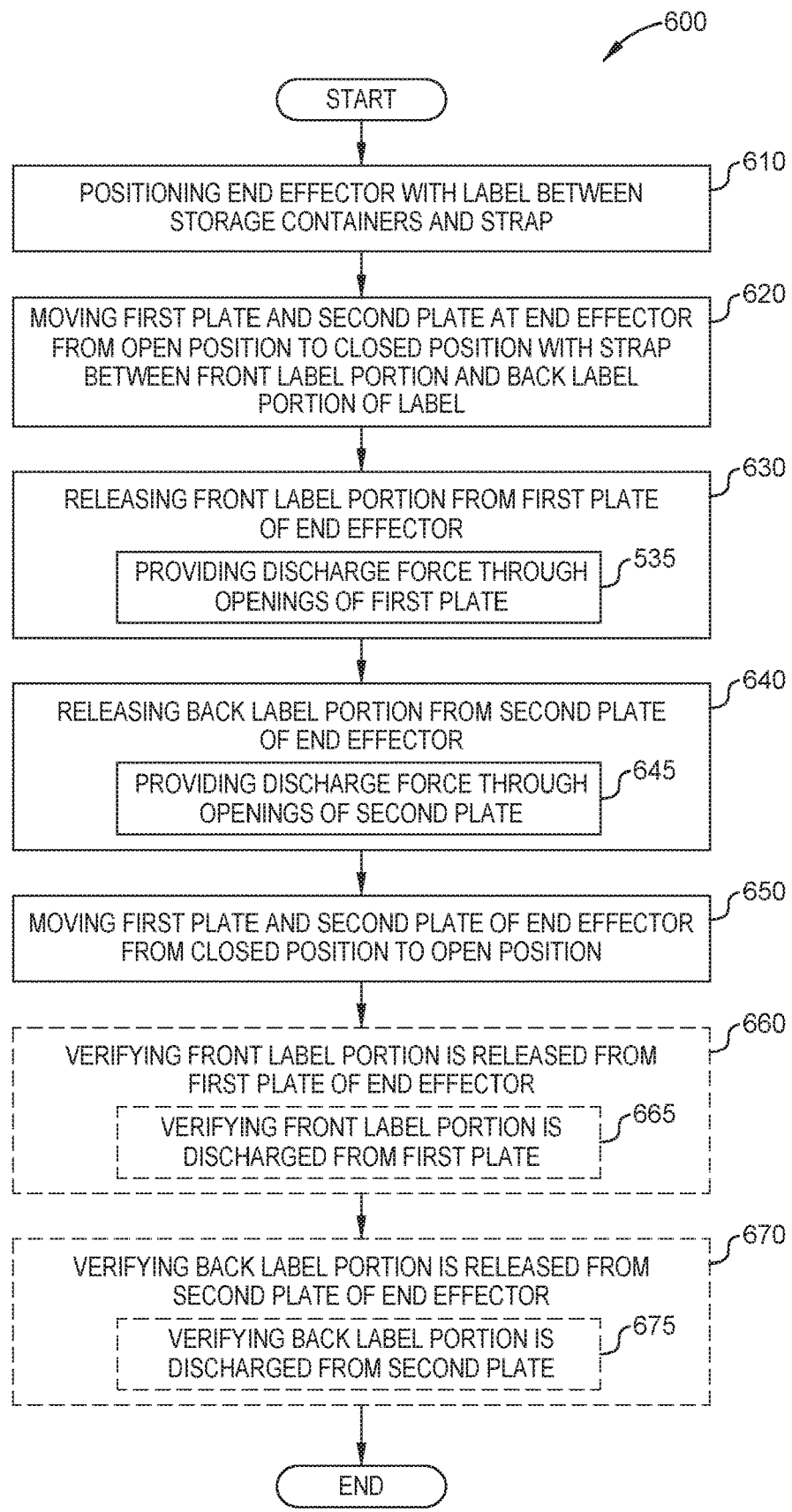
FIG. 6 is a method of applying a label to a strap with an end effector in accordance with one or more embodiments of the present disclosure.

Further, referring to FIG. 6, a method 600 of applying a label to a transport structure in accordance with one or more embodiments of the present disclosure is shown. The method 600 begins at block 610 by positioning the end effector, with the label, between storage containers and a restraining member that particularly includes a strap. For example, the strap may be positioned between a first plate and a second plate of the end effector in block 610. At block 620, the first plate and the second plate of end effector move from an open position to a closed position. When the end effector is in the closed position, the strap is positioned between a front label portion and a back label portion of the label. At block 630, the front label portion is released from the first plate of the end effector. Block 630 may include block 635, in which a discharge force is provided through the openings of the first plate to release the front label portion. Similarly, at block 640, the back label portion is released from the second plate of the end effector. Block 640 may include block 645, in which a discharge force is provided through the openings of the second plate to release the back label portion. At block 650, the first plate and the second plate of end effector move from the closed position to the open position. The method 600 may end following completion of block 650. Optionally, method 600 may include blocks 660 and 670. At block 660, the front label portion is verified to be released from the first plate of the end effector. Block 660 may specifically include block 665 of verifying that the front label portion is discharged from the first plate, such as by determining that the front label portion is not providing resistance to a suction force provided to the openings of the first plate. Similarly, at block 670, the back label portion is verified to be released from the second plate of the end effector. Block 670 may specifically include block 675 of verifying that the back label portion is discharged from the second plate, such as by determining that the back label portion is not providing resistance to a suction force provided to the openings of the second plate.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be used to implement embodiments of the disclosure. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of applying a label to a transport structure, comprising:
   receiving the label from a label dispenser with an end effector, the label comprising information related to a plurality of storage containers secured to the transport structure with a restraining member;
   measuring a position of the end effector relative to an object;
   moving the end effector with the label to a target position based upon the measured position;
   applying the label to the restraining member with the end effector, comprising using the end effector to apply a first portion of the label positioned on a first side of the restraining member to a second portion of the label positioned on a second side of the restraining member;
   moving the end effector away from the storage containers; and
   transporting the transport structure with the storage containers and the label based upon the information of the label.

2. The method of claim 1, wherein the information of the label comprises information that specifies a quantity of storage containers on the transport structure, products included within one or more of the storage containers, or a destination for transport of the storage containers.

3. The method of claim 1, wherein moving the end effector away from the storage containers comprises moving the end effector adjacent the label dispenser to receive another label.

4. The method of claim 1, further comprising:
   obtaining the transport structure;
   arranging the storage containers on the transport structure; and
   securing the storage containers to the transport structure using the restraining member.

5. The method of claim 1, wherein a range-finding sensor coupled to the end effector is used to measure the position of the end effector relative to the object.

6. The method of claim 1, wherein:
   the restraining member comprises a strap, a netting, or a rigid structure; and
   the object comprises at least one of the storage containers, the transport structure, and the restraining member.

7. The method of claim 1, wherein:
   the end effector comprises a first plate and a second plate configured to move between an open position and a closed position;
   in the open position, the first plate and the second plate are spaced apart from each other, and in the closed position, the first plate and the second plate engage each other; and
   the receiving the label from the label dispenser with the end effector comprises:
      positioning the first plate of the end effector adjacent the label dispenser with the end effector in the open position;

dispensing the first portion of the label from the label dispenser;

grasping the first portion of the label with the first plate of the end effector;

positioning the second plate of the end effector adjacent the label dispenser;

dispensing the second portion of the label from the label dispenser; and grasping the second portion of the label with the second plate of the end effector.

8. The method of claim 7, wherein:

the first plate and the second plate of the end effector each comprise a plurality of openings;

a pump is operatively coupled to the end effector;

the grasping the first portion of the label comprises providing a suction force with the pump through the openings of the first plate for the first plate to grasp the first portion of the label; and the grasping the second portion of the label comprises providing a suction force through the openings of the second plate for the second plate to grasp the second portion of the label.

9. The method of claim 7, wherein the restraining member comprises a strap, the first portion of the label comprises a front label portion, the second portion of the label comprises a back label portion, and the applying the label comprises:

positioning the end effector with the label between the storage containers and the strap;

moving the first plate and the second plate of the end effector from the open position to the closed position with the strap positioned between the front label portion and the back label portion;

releasing the front label portion from the first plate of the end effector;

releasing the back label portion from the second plate of the end effector; and moving the first plate and the second plate from the closed position to the open position with the strap positioned between the front label portion and the back label portion.

10. The method of claim 9, wherein:

the first plate and the second plate of the end effector each comprise a plurality of openings;

a pump is operatively coupled to the end effector;

the releasing the front label portion comprises providing a discharge force with the pump through the openings of the first plate for the first plate to release the front label portion; and the releasing the back label portion comprises providing a discharge force with the pump through the openings of the second plate for the second plate to release the front label portion.

11. The method of claim 10, further comprising verifying that the front label portion has been discharged from the first plate and the back label portion has been discharged from the second plate by determining if below a predetermined amount of resistance is achieved through the openings of the first plate or the openings of the second plate.

12. A method of applying a label to a transport structure, comprising:

determining, with a range-finding sensor, a position of a plurality of storage containers secured to the transport structure with a strap;

positioning an end effector with the label between the storage containers and the strap, the end effector comprising a first plate and a second plate and the label comprising a front label portion and a back label portion;

moving the first plate and the second plate of the end effector from an open position to a closed position with the strap positioned between the front label portion and the back label portion;

releasing the front label portion from the first plate and the back label portion from the second plate of the end effector to adhere the front label portion to the back label portion of the label; and moving the first plate and the second plate from the closed position to the open position with the strap remaining positioned between the front label portion and the back label portion.

13. The method of claim 12, wherein:

the first plate and the second plate of the end effector each comprise a plurality of openings;

a first pump is operatively coupled to the end effector;

the releasing the front label portion comprises providing a discharge force with the first pump through the openings of the first plate for the first plate to release the front label portion; and the releasing the back label portion comprises providing a discharge force with the first pump through the openings of the second plate for the second plate to release the front label portion.

14. The method of claim 13, further comprising verifying that the front label portion has been discharged from the first plate and the back label portion has been discharged from the second plate by determining if below a predetermined amount of resistance is achieved through the openings of the first plate or the openings of the second plate.

15. The method of claim 12, wherein:

the label comprises information related to a plurality of storage containers; and the information of the label comprises information that specifies a quantity of storage containers on the transport structure, products included within one or more of the storage containers, or a destination for transport of the storage containers.

16. The method of claim 12, wherein the range-finding sensor is used to measure a position of the end effector relative to the position of the plurality of storage containers.

17. The method of claim 12, wherein the first plate and the second plate of the end effector are linearly movable with respect to each other between the open position and the closed position.

18. The method of claim 12, wherein the first plate and the second plate of the end effector are rotationally movable with respect to each other between the open position and the closed position.

19. The method of claim 13, wherein at least one of: (i) the plurality of openings of the first plate are uniformly distributed across a surface of the first plate, or (ii) the plurality of openings of the second plate are uniformly distributed across a surface of the second plate.

20. The method of claim 13, wherein:

a second pump is operatively coupled to the end effector; and at least one of: (i) one or more of the plurality of openings of the first plate are separately controllable via the first pump and the second pump, or (ii) one or more of the plurality of openings of the second plate are separately controllable via the first pump and the second pump.

* * * * *